(12) United States Patent
Ueno et al.

(10) Patent No.: US 10,600,401 B2
(45) Date of Patent: Mar. 24, 2020

(54) NOISE REDUCTION DEVICE, MOBILE BODY DEVICE, AND NOISE REDUCTION METHOD

(71) Applicant: Panasonic Intellectual Property Management Co., Ltd., Osaka (JP)

(72) Inventors: Shotaro Ueno, Osaka (JP); Yoshiyuki Hayashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/314,593

(22) PCT Filed: Jun. 28, 2017

(86) PCT No.: PCT/JP2017/023721
§ 371 (c)(1),
(2) Date: Dec. 31, 2018

(87) PCT Pub. No.: WO2001/008487
PCT Pub. Date: Jan. 11, 2018

(65) Prior Publication Data
US 2019/0259371 A1    Aug. 22, 2019

(30) Foreign Application Priority Data
Jul. 5, 2016 (JP) ................... 2016-133758

(51) Int. Cl.
*G10K 11/178* (2006.01)
*F01N 1/06* (2006.01)
*B60R 11/02* (2006.01)

(52) U.S. Cl.
CPC ........ *G10K 11/17854* (2018.01); *B60R 11/02* (2013.01); *F01N 1/065* (2013.01);
(Continued)

(58) Field of Classification Search
CPC ....... G10K 11/17854; G10K 11/17883; G10K 11/178; G10K 2210/1282;
(Continued)

(56) References Cited

U.S. PATENT DOCUMENTS 7,352,869 B2    4/2008  Inoue et al.
7,536,018 B2 *  5/2009  Onishi ............ G10K 11/17883
                                                        381/71.8
(Continued)

FOREIGN PATENT DOCUMENTS

JP    2004-361721    12/2004
JP    2012-144955    8/2012
(Continued)

OTHER PUBLICATIONS

International Search Report of PCT application No. PCT/JP2017/023721 dated Sep. 19, 2017.
(Continued)

*Primary Examiner* — Vivian C Chin
*Assistant Examiner* — Con P Tran
(74) *Attorney, Agent, or Firm* — Greenblum & Bernstein, P.L.C.

(57) ABSTRACT

A noise reduction device includes a second corrector that generates a correction signal by correcting an output signal or a standard signal by a predetermined parameter and adds the generated correction signal to an error signal, to generate a corrected error signal approximating the error signal to an error signal indicating a residual sound occurring in a sound reception location.

6 Claims, 9 Drawing Sheets

(52) U.S. Cl.
CPC ...... *G10K 11/178* (2013.01); *G10K 11/17883* (2018.01); *G10K 2210/1282* (2013.01); *G10K 2210/3035* (2013.01); *G10K 2210/3047* (2013.01); *G10K 2210/3055* (2013.01)

(58) Field of Classification Search
CPC ... G10K 2210/3035; G10K 2210/3047; G10K 2210/3055; F01N 1/065; B60R 11/02
USPC ... 381/71.1–71.9, 71.11–71.14, 94.1, 98, 97, 381/96, 95, 86, 302, 365, 389; 700/28, 700/94; 708/322
See application file for complete search history.

(56) References Cited

U.S. PATENT DOCUMENTS

| | | | | |
|---|---|---|---|---|
| 7,574,006 B2 * | 8/2009 | Funayama | ........... | G10K 11/178 375/232 |
| 8,027,484 B2 * | 9/2011 | Yoshida | ............. | G10K 11/1788 381/71.11 |
| 8,111,834 B2 * | 2/2012 | Kobayashi | ........... | G10K 11/178 381/71.11 |
| 8,817,998 B2 * | 8/2014 | Inoue | ................... | G10K 11/178 381/71.9 |
| 9,640,165 B2 * | 5/2017 | Sakamoto | .............. | G10K 11/16 |
| 10,283,108 B2 * | 5/2019 | Sugai | ............... | G10K 11/17881 |
| 2004/0247137 A1 | 12/2004 | Inoue et al. | | |
| 2012/0300955 A1 | 11/2012 | Iseki et al. | | |
| 2013/0294876 A1 | 11/2013 | Kobayashi et al. | | |

FOREIGN PATENT DOCUMENTS

| | | |
|---|---|---|
| JP | 531823113 | 10/2013 |
| JP | 582905213 | 12/2015 |

OTHER PUBLICATIONS

The Extended European Search Report from European Patent Office (EPO) dated Jul. 22, 2019 for the related European Patent Application No. 17824093.3.

* cited by examiner

NOISE REDUCTION DEVICE, MOBILE BODY DEVICE, AND NOISE REDUCTION METHOD

CROSS-REFERENCE TO RELATED APPLICATIONS

This application is a U.S. national stage application of the PCT International Application No. PCT/JP2017/023721 filed on Jun. 28, 2017, which claims the benefit of foreign priority of Japanese patent application No. 2016-133758 filed on Jul. 5, 2016, the contents all of which are incorporated herein by reference.

TECHNICAL FIELD

The present invention relates to a noise reduction device that actively reduces noise.

BACKGROUND ART

A conventionally known noise reduction device actively reduces noise in a sound reception location, by outputting a sound for cancelling the noise from a speaker. For example, PTL 1 discloses an active sound cancellation device as an example of such a noise reduction device.

CITATION LIST

Patent Literature

PTL 1: Japanese Patent No. 5829052

SUMMARY OF THE INVENTION

The present invention provides a noise reduction device, a mobile body device, and a noise reduction method that can effectively reduce noise in a sound reception location even when the sound reception location and a sound collection location are different.

A noise reduction device of an aspect of the present invention is a noise reduction device that reduces noise in a sound reception location, and includes a first input terminal, a standard signal generator, an adaptive filter unit, an output terminal, a first corrector, a second input terminal, a second corrector, and a filter coefficient update unit. A noise reference signal correlated with noise is input into the first input terminal. The standard signal generator generates a standard signal having a frequency specified based on the input noise reference signal. The adaptive filter unit generates an output signal used to output a cancellation sound for reducing the noise, by applying a filter coefficient to the generated standard signal. The output terminal outputs the generated output signal. The first corrector generates a corrected standard signal by correcting the generated standard signal based on a transfer characteristic of a transmission route of the output signal. The second input terminal receives input of an error signal based on a residual sound occurring in a sound collection location different from the sound reception location due to interference between the cancellation sound and the noise. The second corrector generates a correction signal by correcting an output signal or a standard signal by a predetermined parameter and adds the generated correction signal to an error signal, to generate a corrected error signal approximating the error signal to an error signal indicating a residual sound occurring in a sound reception location. The filter coefficient update unit sequentially updates the filter coefficient based on the generated corrected error signal and the generated corrected standard signal.

The present invention provides a noise reduction device, a mobile body device, and a noise reduction method that can effectively reduce noise in a sound reception location even when the sound reception location and a sound collection location are different.

DESCRIPTION OF EMBODIMENTS

Figure 1:
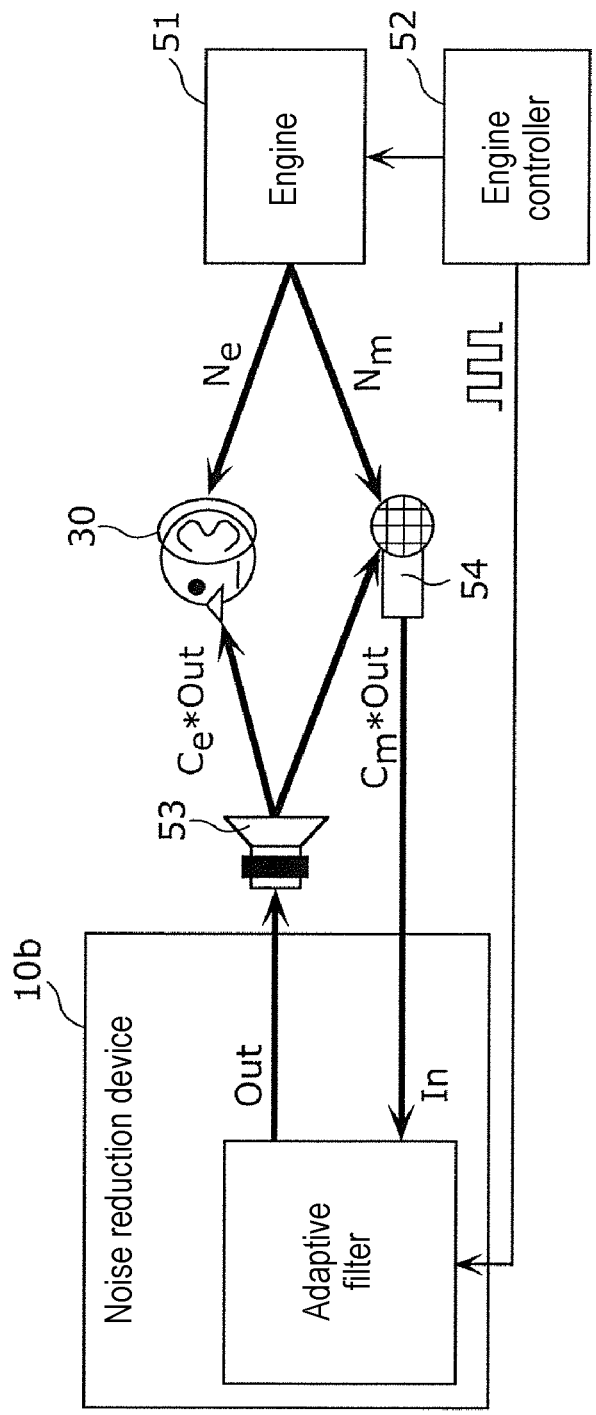
FIG. 1 is a diagram showing an overview of a general noise reduction device.

A problem in a conventional device will briefly be described prior to description of exemplary embodiments of the present invention. A problem of a conventional noise reduction device is that noise in a sound reception location cannot be reduced sufficiently when a location (sound reception location) of a sound receiver and a location (sound collection location) of a microphone are different.

A noise reduction device of an aspect of the present invention is a noise reduction device that reduces noise in a sound reception location, and includes a first input terminal, a standard signal generator, an adaptive filter unit, an output terminal, a first corrector, a second input terminal, a second corrector, and a filter coefficient update unit. A noise reference signal correlated with noise is input into the first input terminal. The standard signal generator generates a standard signal having a frequency specified based on the input noise reference signal. The adaptive filter unit generates an output signal used to output a cancellation sound for reducing the noise, by applying a filter coefficient to the generated standard signal. The output terminal outputs the generated output signal. The first corrector generates a corrected standard signal by correcting the generated standard signal based on a transfer characteristic of a transmission route of the output signal. The second input terminal receives input of an error signal based on a residual sound occurring in a sound collection location different from the sound reception location due to interference between the cancellation sound and the noise. The second corrector generates a correction signal by correcting an output signal or a standard signal by a predetermined parameter and adds the generated correction signal to an error signal, to generate a corrected error signal approximating the error signal to an error signal indicating a residual sound occurring in a sound reception location. The filter coefficient update unit sequentially updates the filter coefficient based on the generated corrected error signal and the generated corrected standard signal.

Such a noise reduction device can effectively reduce noise in a sound reception location, even when the sound reception location and a sound collection location are different.

For example, the second corrector generates the correction signal by correcting the output signal by a predetermined parameter.

Such a noise reduction device can effectively reduce noise in a sound reception location even when the sound reception location and a sound collection location are different, by performing signal processing of correcting the output signal by a predetermined parameter.

Additionally, for example, the second corrector generates the correction signal by correcting the standard signal by the predetermined parameter, and applying the filter coefficient.

Such a noise reduction device can effectively reduce noise in a sound reception location even when the sound reception location and a sound collection location are different, by performing signal processing of correcting the standard signal by a predetermined parameter. Additionally, such a noise reduction device can apply the predetermined parameter to a signal of a single frequency, so that the signal processing amount (operation amount) can be reduced significantly.

Additionally, for example, the noise reduction device further includes a storage unit that stores multiple predetermined parameters. The second corrector further acquires a moving state signal correlated with a moving state of a mobile body device using the noise reduction device, selects one of the multiple predetermined parameters stored in the storage unit according to the acquired moving state signal, and generates a correction signal by correcting the output signal or standard signal by the selected predetermined parameter.

A mobile body device of an aspect of the present invention includes a noise reduction device, a sound output device that outputs a cancellation sound by use of an output signal, and a sound collection device that is arranged in a sound collection location and outputs an error signal to a second input terminal.

Such a mobile body device can effectively reduce noise in a sound reception location, even when the sound reception location and a sound collection location are different.

A noise reduction method of an aspect of the present invention is a noise reduction method of reducing noise in a sound reception location, the method generating a standard signal having a frequency specified based on a noise reference signal correlated with the noise. Furthermore, by applying a filter coefficient to the generated standard signal, an output signal used to output a cancellation sound for reducing the noise is generated. Moreover, a corrected standard signal is generated by correcting the generated standard signal based on a transfer characteristic of a transmission route of the output signal. Moreover, a correction signal is generated by correcting the output signal or the standard signal by a predetermined parameter; The generated correction signal is added to an error signal based on a residual sound occurring in a sound collection location different from the sound reception location due to interference between the cancellation sound and the noise, to generate a corrected error signal approximating the error signal to an error signal indicating a residual sound occurring in the sound reception location. Furthermore, the filter coefficient is sequentially updated based on the generated corrected error signal and the generated corrected standard signal.

Such a noise reduction method can effectively reduce noise in a sound reception location, even when the sound reception location and a sound collection location are different.

Hereinafter, a specific description of exemplary embodiments will be given with reference to the drawings. Note that the following exemplary embodiments provide comprehensive or specific examples of the present disclosure. Numerical values, shapes, materials, components, arrangement positions and connection modes of the components, steps, and order of the steps, for example, illustrated in the following exemplary embodiments are examples, and therefore are not intended to limit the present invention. Among the constituent elements in the following exemplary embodiments, constituent elements not recited in the independent claim indicating the broadest concept are described as optional constituent elements.

The diagrams are schematic diagrams, and illustration is not necessarily strictly accurate. Note that in the drawings, substantially the same configurations are denoted by the same reference numerals, and overlapping descriptions may be omitted or simplified.

First Exemplary Embodiment

[Outline]

First, an overview of a noise reduction device of a first exemplary embodiment will be described. Hereinbelow, an operation of a general noise reduction device will be described. FIG. 1 is a diagram showing an overview of a general noise reduction device.

Noise reduction device 10b shown in FIG. 1 is installed in a vehicle interior, and is a device that reduces noise occurring during travel of an automobile, for example. Noise caused by engine 51 is instantaneously a sound close to a single-frequency sine wave. Hence, noise reduction device 10b acquires a pulse signal indicating the frequency of engine 51 from engine controller 52 controlling engine 51, and outputs a cancellation sound for cancelling the noise from speaker 53. An adaptive filter is used to generate the cancellation sound, and the cancellation sound is generated such that a residual sound acquired by microphone 54 is reduced.

As shown in FIG. 1, the transfer characteristic from a location (sound output location) of speaker 53 to sound reception location 30 is expressed by $C_e$, the transfer characteristic from the location of speaker 53 to a location (sound collection location) of microphone 54 is expressed by $C_m$, and an output signal for outputting a cancellation sound is expressed by reference sign Out. In this case, a cancellation sound that arrives at sound reception location 30 is expressed by $C_e$*Out, and a cancellation sound that arrives at the location (sound collection location) of microphone 54 is expressed by $C_m$*Out. Note that "*" indicates a convolution operator.

Figure 2A:
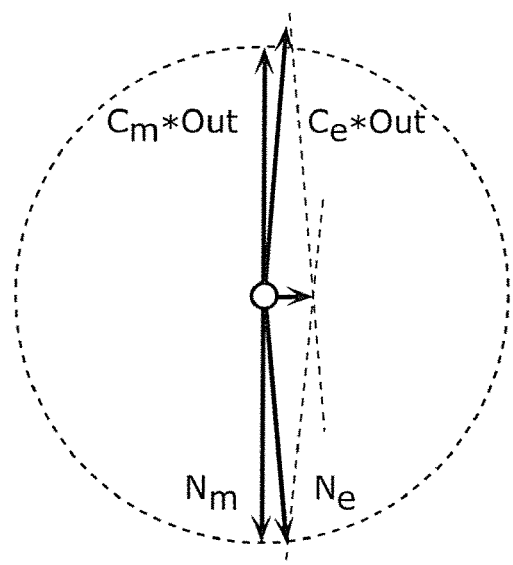
FIG. 2A is a vector diagram of a cancellation sound and noise.

FIG. 2A is a vector diagram of a cancellation sound and noise. As shown in FIG. 2A, according to noise reduction device 10b, cancellation sound $C_m$*Out that arrives at microphone 54 from speaker 53 is theoretically a sound having the same amplitude as noise $N_m$ that arrives at microphone 54 from engine 51, and a phase shifted by 180 degrees.

Note that when amplitude is R, frequency is ω, and phase is θ, noise $N_m$ is expressed by the following (Equation 1), and $C_m$*out is expressed by the following (Equation 2). Noise reduction device 10b can output a cancellation sound for cancelling noise, by calculating filter coefficient A and filter coefficient B in (Equation 2) by the least mean square (LMS) method, for example.

[Expression 1]

$$N_m = R \cdot \sin(\omega t + \theta) \qquad \text{(Equation 1)}$$

$$C_m \text{*Out} = R \cdot \sin[\omega t(\theta - \pi)] = A \cdot \sin(\omega t) + B \cdot \cos(\omega t)$$

$$\text{where } R + \sqrt{A^2 + B^2},\ \theta - \pi = \tan^{-1}(B/A) \qquad \text{(Equation 2)}$$

Figure 2B:
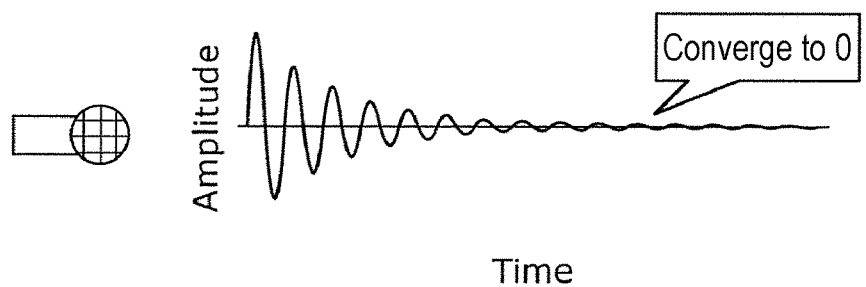
FIG. 2B is a schematic diagram showing a temporal waveform of noise audible in a location of a microphone.

FIG. 2B is a schematic diagram showing a temporal waveform of noise audible in a location of microphone 54. In this case, as shown in FIG. 2B, noise audible in the location of microphone 54 converges to 0.

Figure 2C:
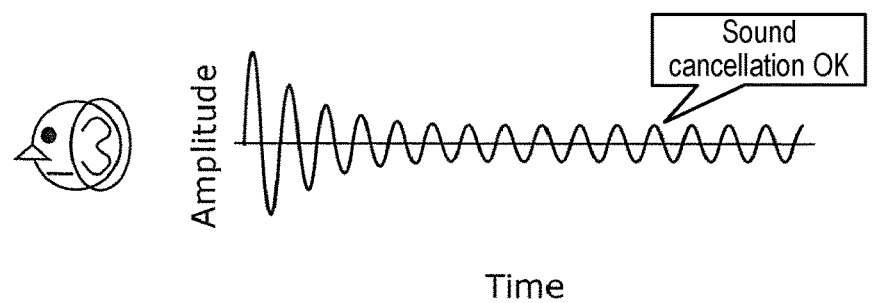
FIG. 2C is a schematic diagram showing a temporal waveform of noise audible in a sound reception location.

In general, sound reception location 30 and the location of microphone 54 do not match completely. Accordingly, as shown in the vector diagram of FIG. 2A, the phase difference between cancellation sound $C_e$*Out that arrives at sound reception location 30 from speaker 53 and noise $N_e$ that arrives at sound reception location 30 from engine 51 slightly deviates from 180 degrees. FIG. 2C is a schematic diagram showing a temporal waveform of noise audible in sound reception location 30. As shown in FIG. 2C, noise audible in sound reception location 30 is not cancelled out completely, but is reduced.

Incidentally, arrangement of microphone 54 is limited by vehicle safety standards and equipment (i.e., sunroof) arranged in the vehicle interior. Accordingly, sound reception location 30 and the location of microphone 54 may be separated in some cases.

Figure 3A:
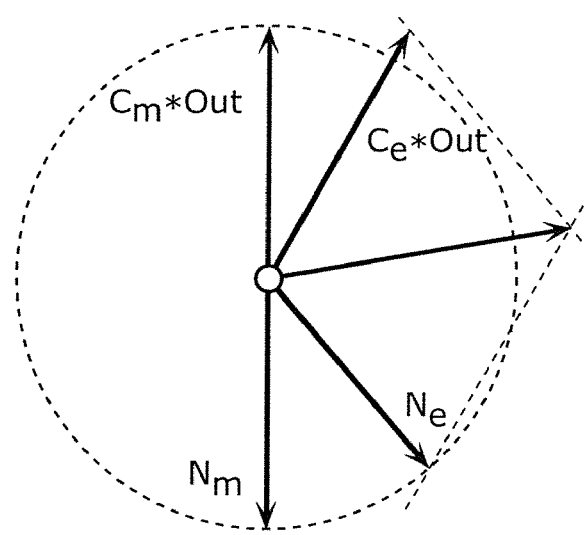
FIG. 3A is a vector diagram of a cancellation sound and noise when a sound reception location and a location of a microphone differ largely.

FIG. 3A is a vector diagram of a cancellation sound and noise when sound reception location 30 and the location of microphone 54 differ largely. When sound reception location 30 and the location of microphone 54 differ largely, the phase difference between cancellation sound $C_e$*Out and noise $N_e$ may deviate largely from 180 degrees, as shown in FIG. 3A.

Figure 3B:
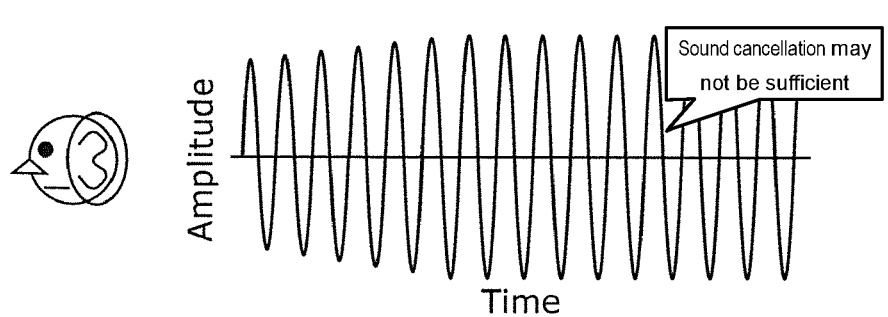
FIG. 3B is a schematic diagram showing a temporal waveform of noise audible in a sound reception location when a sound reception location and a location of a microphone differ largely.

FIG. 3B is a schematic diagram showing a temporal waveform of noise audible in sound reception location 30 when sound reception location 30 and the location of microphone 54 differ largely. As shown in the example of FIG. 3A, when the phase difference between cancellation sound $C_e$*Out and noise $N_e$ deviates largely from 180 degrees, noise audible in sound reception location 30 is not reduced in some cases, as shown in FIG. 3B.

Figure 4:
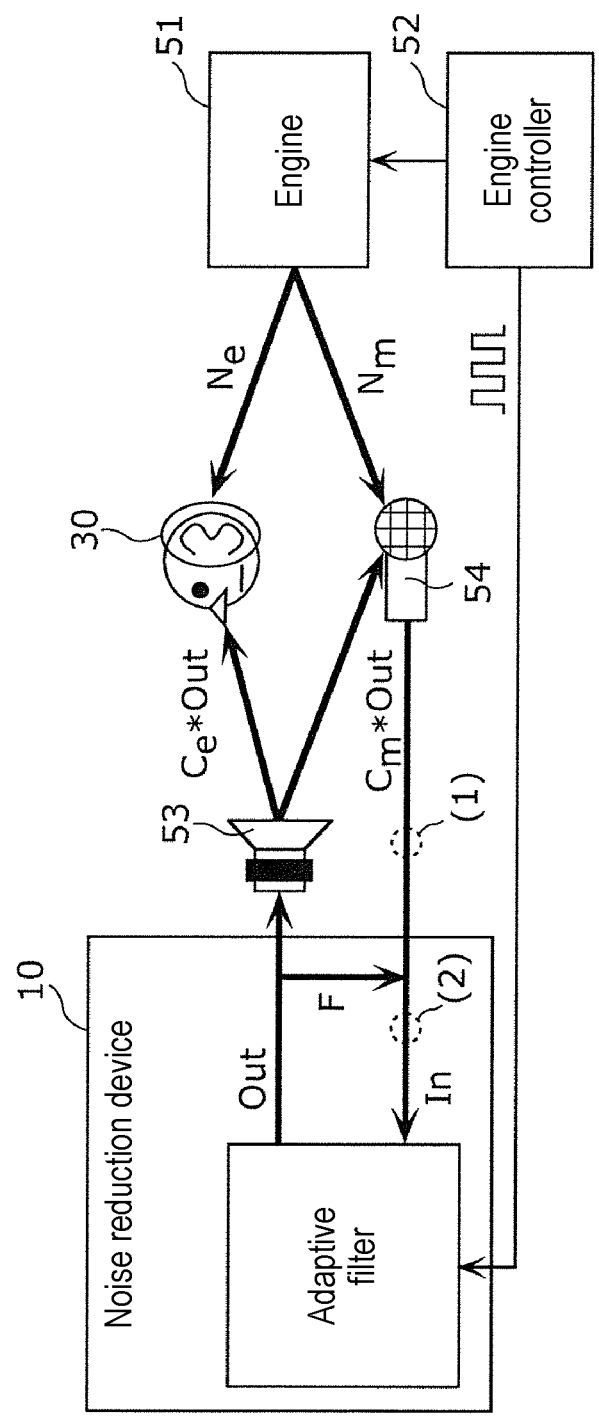
FIG. 4 is a diagram showing an overview of a noise reduction device of a first exemplary embodiment.

The noise reduction device of the first exemplary embodiment can effectively reduce noise audible in sound reception location 30, by operating the adaptive filter such that microphone 54 is installed in sound reception location 30. FIG. 4 is a diagram showing an overview of the noise reduction device of the first exemplary embodiment.

In noise reduction device 10, feedback term F from output signal Out to input signal In is provided, to operate the adaptive filter (later-mentioned adaptive filter unit and filter coefficient update unit) such that microphone 54 is installed in sound reception location 30. According to feedback term F (predetermined parameter F), input to the adaptive filter is 0 when noise audible in sound reception location 30 is 0. Specifically, in FIG. 4, input to the adaptive filter is 0 not at point (1), but at point (2). That is, the following (Equation 3) holds.

[Expression 2]

$$N_m + C_m\text{*Out} + F\text{*Out} = 0 \qquad \text{(Equation 3)}$$

When noise audible in sound reception location 30 is cancelled, cancellation sound $C_e$*Out and noise $N_e$ satisfy the following (Equation 4).

[Expression 3]

$$N_e + C_e\text{*Out} = 0 \qquad \text{(Equation 4)}$$

Based on the above (Equation 3) and (Equation 4), the following (Equation 5) holds. That is, when the transfer characteristic from the sound output location of the cancellation sound to sound reception location 30 is denoted by $C_e$, the transfer characteristic from the sound output location to the sound collection location is denoted by $C_m$, noise in sound reception location 30 is denoted by $N_e$, and noise in the sound collection location is denoted by $N_m$, predetermined parameter F is defined based on (Equation 5).

[Expression 4]

$$F = (N_m/N_e) \cdot C_e - C_m \qquad \text{(Equation 5)}$$

Figure 5A:
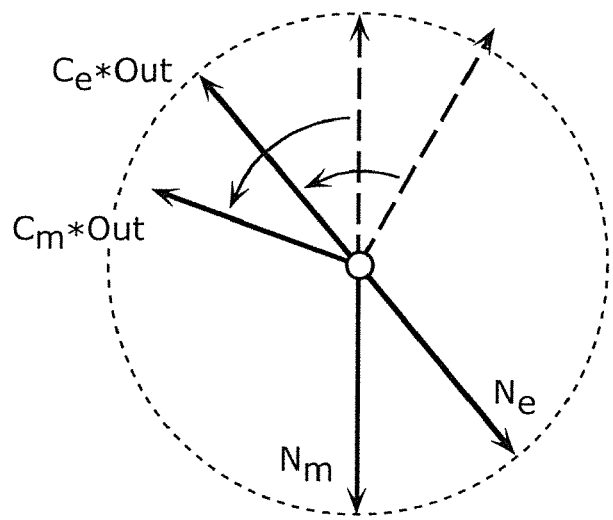
FIG. 5A is a vector diagram of noise and a cancellation sound output from the noise reduction device of the first exemplary embodiment.

Noise reduction device 10 can effectively reduce noise audible in sound reception location 30, even when sound reception location 30 and the location of microphone 54 are different. FIG. 5A is a vector diagram of noise and a cancellation sound output from noise reduction device 10.

Figure 5B:
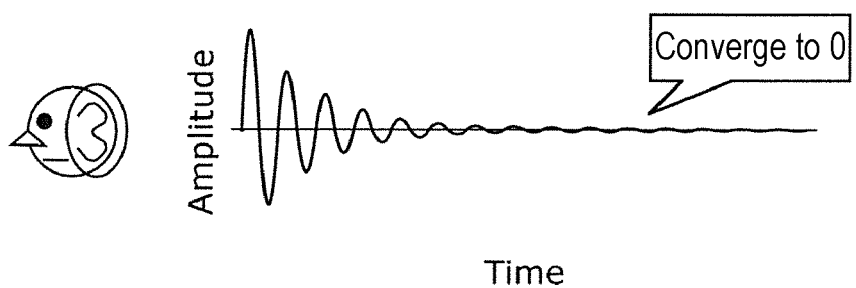
FIG. 5B is a schematic diagram showing a temporal waveform of noise audible in sound reception location 30 when the noise reduction device of the first exemplary embodiment is used.

As shown in FIG. 5A, the gain and phase of cancellation sound $C_e$*Out output by noise reduction device 10 is adjusted by feedback term F, and the phase difference between cancellation sound $C_e$*Out and noise $N_e$ is 180 degrees. FIG. 5B is a schematic diagram showing a temporal waveform of noise audible in sound reception location 30 when noise reduction device 10 is used. As shown in FIG. 5B, noise audible in sound reception location 30 converges to 0.

Figure 5C:
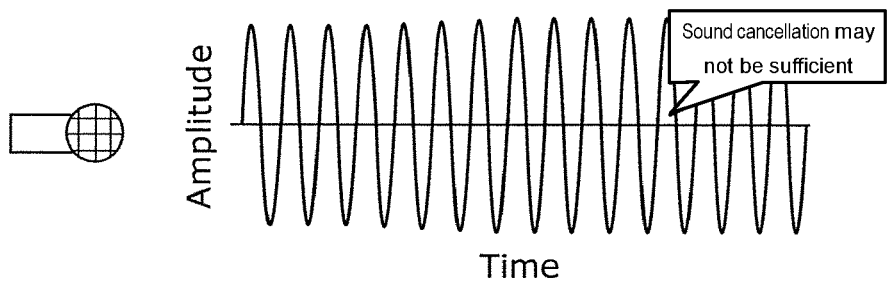
FIG. 5C is a schematic diagram showing a temporal waveform of noise audible in a location of a microphone when the noise reduction device of the first exemplary embodiment is used.

On the other hand, in the example of FIG. 5A, when noise reduction device 10 is used, the phase difference between cancellation sound $C_m$*Out and noise $N_m$ largely deviates from 180 degrees. FIG. 5C is a schematic diagram showing a temporal waveform of noise audible in the location of microphone 54 when noise reduction device 10 is used. As shown in FIG. 5C, noise audible in the location of microphone 54 is not sufficiently reduced.

[Overall Configuration of Vehicle Including Noise Reduction Device]

Figure 6:
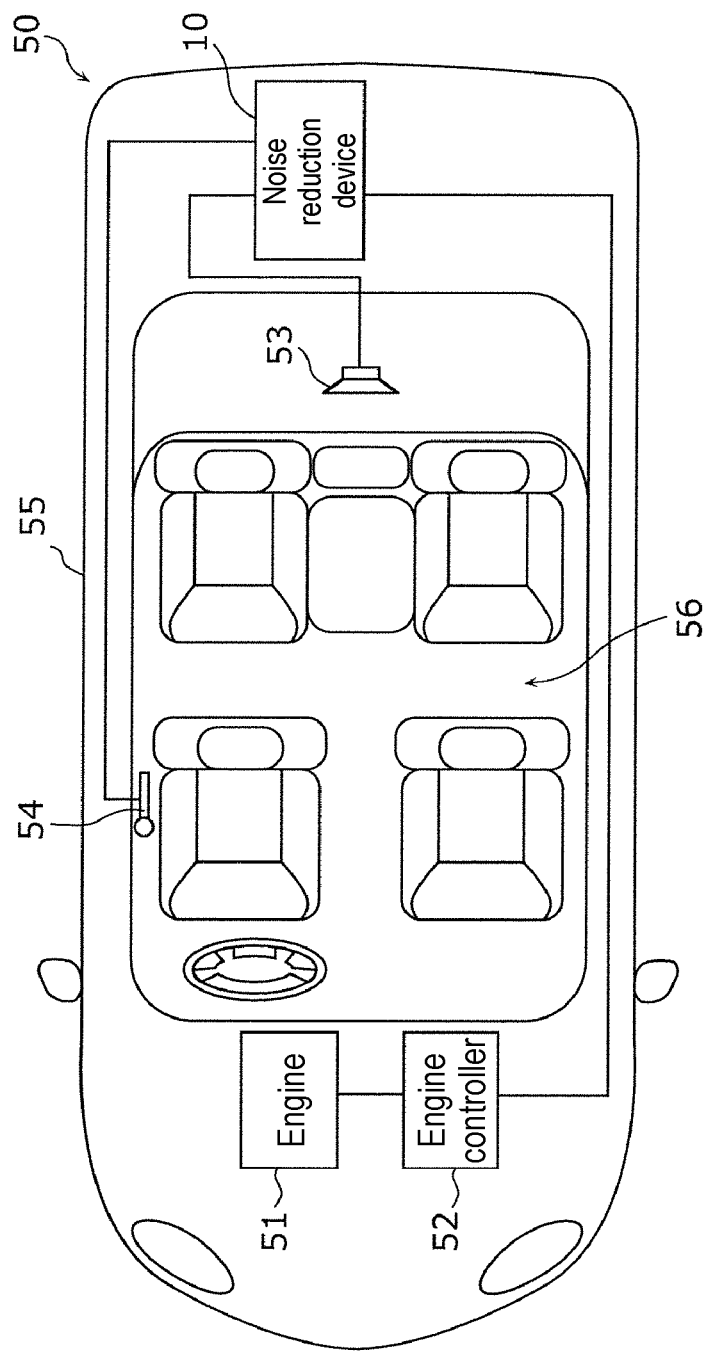
FIG. 6 is a schematic diagram of a vehicle including the noise reduction device of the first exemplary embodiment.

As has been described, noise reduction device 10 can effectively reduce noise audible in sound reception location 30, even when sound reception location 30 and the location of microphone 54 are different. Hereinafter, details of noise reduction device 10 will be described. In the first exemplary embodiment, noise reduction device 10 is mounted on a vehicle, as an example. FIG. 6 is a schematic diagram of the vehicle including noise reduction device 10.

Vehicle 50 is an example of a mobile body device, and includes noise reduction device 10, engine 51, engine controller 52, speaker 53, microphone 54, and vehicle main body 55. Although vehicle 50 is specifically an automobile, the invention is not particularly limited.

Engine 51 is a power source of vehicle 50, and is also a drive unit which is a source of noise in space 56 as the vehicle interior of vehicle 50. Engine 51 is arranged in a space different from space 56, for example. Specifically, engine 51 is set in a space formed inside a hood of vehicle main body 55.

Engine controller 52 controls (drives) engine 51, based on an operation of an accelerator or the like by a driver of vehicle 50. Additionally, engine controller 52 outputs a pulse signal (engine pulse signal) corresponding to the speed (frequency) of engine 51, as a noise reference signal. The frequency of the pulse signal is proportional to the speed (frequency) of engine 51, for example. The pulse signal is specifically an output signal of a top dead center (TDC) sensor, or a so-called tacho pulse. Note that the noise reference signal may be in any form, as long as the noise reference signal is correlated with noise.

Speaker 53 is an example of a sound output device, and is a speaker that outputs a cancellation sound by use of an output signal. Speaker 53 is arranged in space 56. The location (sound output location) of speaker 53 is not particularly limited.

Microphone 54 is an example of a sound collection device, and acquires a residual sound that occurs in a sound collection location due to interference between a cancellation sound and noise. Additionally, microphone 54 outputs an error signal based on the acquired residual sound. Microphone 54 is arranged in space 56. The location (sound collection location) of microphone 54 is not particularly limited. As has been described, noise reduction device 10 can effectively reduce noise even when the sound collection location and sound reception location 30 are different.

Vehicle main body 55 is a structure configured of a chassis, a body, and other parts of vehicle 50. Vehicle main body 55 forms space 56 (vehicle interior space) in which speaker 53 and microphone 54 are arranged.

[Configuration and Operation of Noise Reduction Device]

Figure 7:
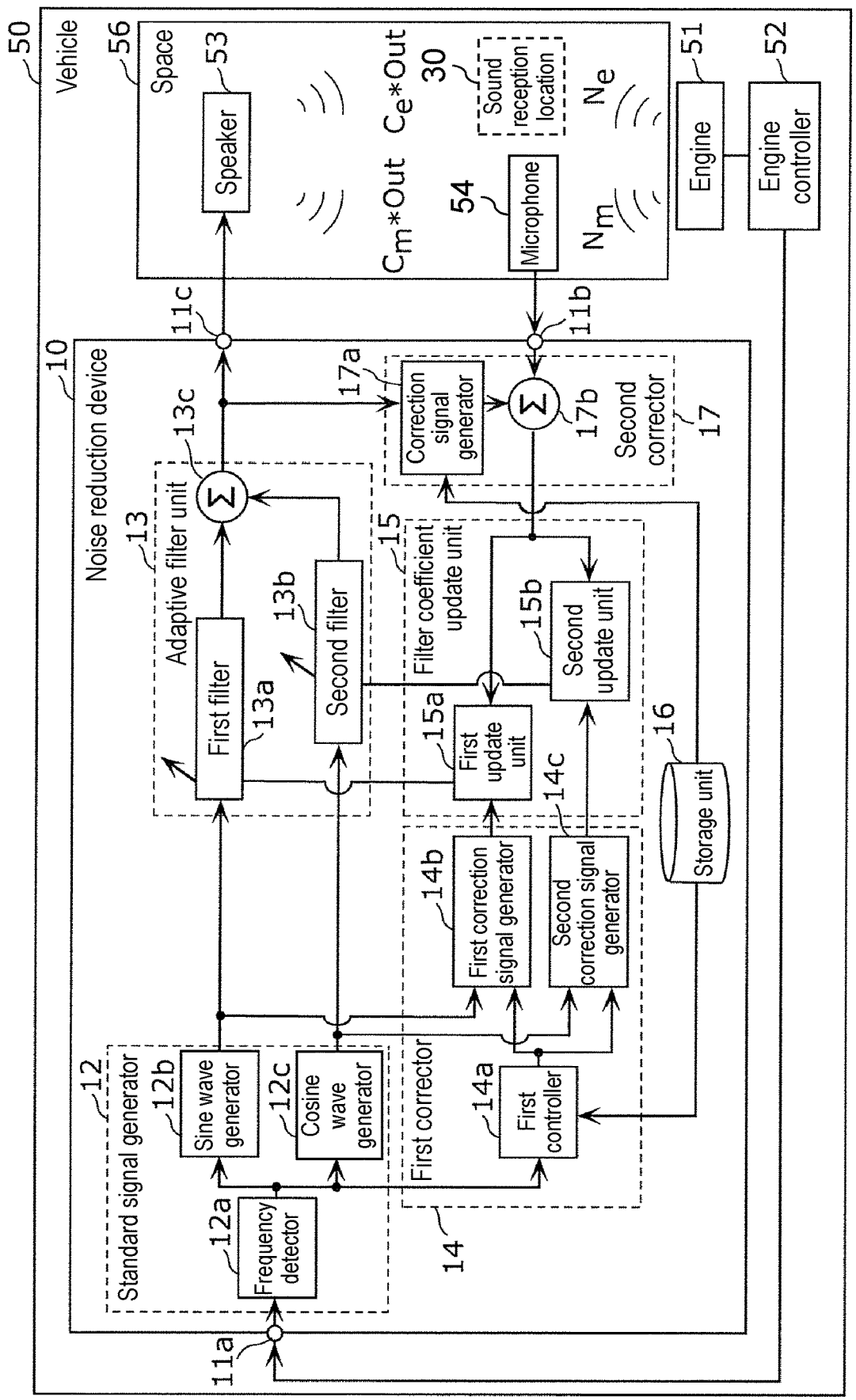
FIG. 7 is a functional block diagram of the noise reduction device of the first exemplary embodiment.
Figure 8:
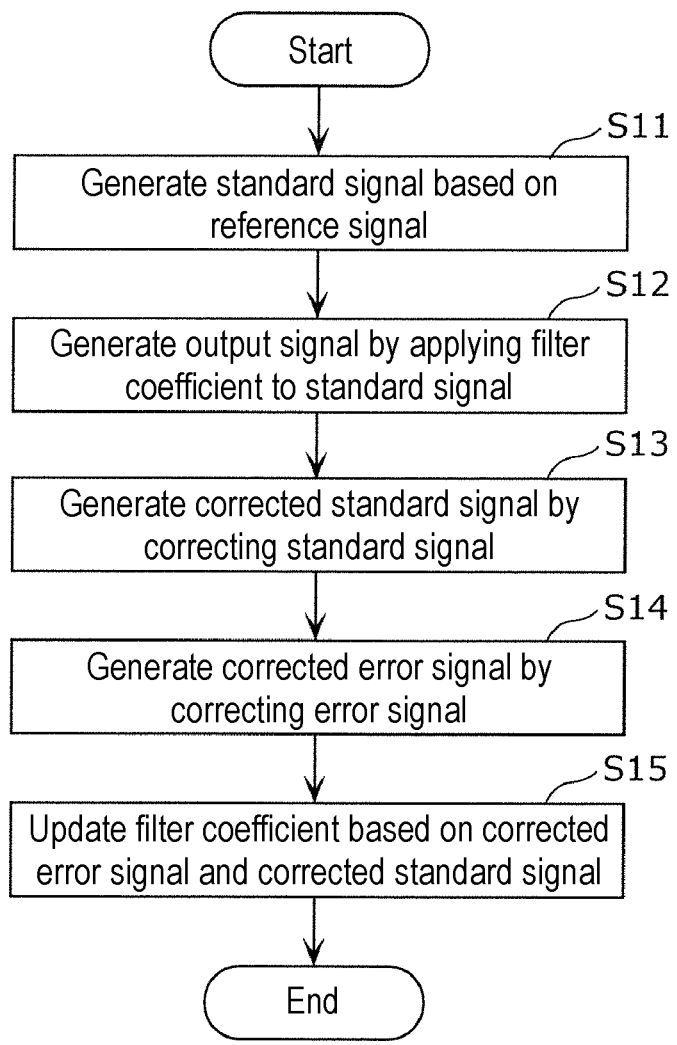
FIG. 8 is a flowchart of an operation of the noise reduction device of the first exemplary embodiment.

Next, a configuration and operation of noise reduction device 10 will be described. FIG. 7 is a functional block diagram of noise reduction device 10. FIG. 8 is a flowchart of an operation of noise reduction device 10.

Noise reduction device 10 is an active noise reduction device that reduces noise in sound reception location 30. As shown in FIG. 7, noise reduction device 10 includes first input terminal 11a, standard signal generator 12, adaptive filter unit 13, output terminal 11c, first corrector 14, second input terminal 11b, second corrector 17, and filter coefficient update unit 15. Each of standard signal generator 12, adaptive filter unit 13, first corrector 14, second corrector 17, and filter coefficient update unit 15 may be implemented by a processor such as a digital signal processor (DSP), for example, but may also be implemented by a microcomputer or a dedicated communication circuit. Hereinafter, a detailed description will be given of components related to each step shown in the flowchart of FIG. 8.

[Generation of Standard Signal]

First, standard signal generator 12 generates a standard signal (S11 of FIG. 8) based on a noise reference signal input into first input terminal 11a.

First input terminal 11a is a terminal formed of metal or the like. A noise reference signal correlated with noise is input into first input terminal 11a. The noise reference signal is a pulse signal output by engine controller 52, for example.

To be more specific, standard signal generator 12 specifies an instantaneous frequency of noise based on the noise reference signal input into first input terminal 11a, and generates a standard signal having the specified frequency. Standard signal generator 12 specifically includes frequency detector 12a, sine wave generator 12b, and cosine wave generator 12c.

Frequency detector 12a detects a frequency of the pulse signal, and outputs the detected frequency to sine wave generator 12b, cosine wave generator 12c, and first controller 14a included in first corrector 14. In other words, frequency detector 12a specifies an instantaneous frequency of noise.

Sine wave generator 12b outputs a sine wave having the frequency detected by frequency detector 12a as a first standard signal. The first standard signal is an example of a standard signal, and is a signal expressed by $\sin(2\pi ft) = \sin(\omega t)$ when f denotes the frequency detected by frequency detector 12a. That is, the first standard signal has the frequency (same frequency as noise) specified by frequency detector 12a. The first standard signal is output to first filter 13a included in adaptive filter unit 13, and first correction signal generator 14b included in first corrector 14.

Cosine wave generator 12c outputs a cosine wave having the frequency detected by frequency detector 12a as a second standard signal. The second standard signal is an example of a standard signal, and is a signal expressed by $\cos(2\pi ft) = \cos(\omega t)$ when f denotes the frequency detected by frequency detector 12a. That is, the second standard signal has the frequency (same frequency as noise) specified by frequency detector 12a. The second standard signal is output to second filter 13b included in adaptive filter unit 13, and second correction signal generator 14c included in first corrector 14.

[Generation of Output Signal]

Adaptive filter unit 13 generates an output signal (S12 of FIG. 8) by applying (multiplying) a filter coefficient to the standard signal generated by standard signal generator 12. The output signal is used to output a cancellation sound for reducing noise, and is output to output terminal 11c. Adaptive filter unit 13 includes first filter 13a, second filter 13b, and adder 13c. Adaptive filter unit 13 is a so-called adaptive notch filter.

First filter 13a multiplies the first standard signal output by sine wave generator 12b by a first filter coefficient. The first filter coefficient used for multiplication is a filter coefficient corresponding to A in the aforementioned (Equation 2), and is sequentially updated by first update unit 15a included in filter coefficient update unit 15. A first output signal which is the first standard signal multiplied by the first filter coefficient is output to adder 13c.

Second filter 13b multiplies the second standard signal output by cosine wave generator 12c by a second filter coefficient. The second filter coefficient used for multiplication is a filter coefficient corresponding to B in the aforementioned (Equation 2), and is sequentially updated by second update unit 15b included in filter coefficient update unit 15. A second output signal which is the second standard signal multiplied by the second filter coefficient is output to adder 13c.

Adder 13c adds the first output signal output from first filter 13a and the second output signal output from second filter 13b. Adder 13c outputs the output signal obtained by adding the first output signal and the second output signal to output terminal 11c.

Output terminal 11c is a terminal formed of metal or the like. The output signal generated by adaptive filter unit 13 is output to output terminal 11c. Speaker 53 is connected to output terminal 11c. Hence, the output signal is output to speaker 53 through output terminal 11c. Speaker 53 outputs a cancellation sound based on the output signal.

[Correction of Standard Signal]

First corrector 14 generates a corrected standard signal (S13 of FIG. 8) by correcting the generated standard signal based on a transfer characteristic of a transmission route of the output signal. First corrector 14 includes first controller 14a, first correction signal generator 14b, and second correction signal generator 14c.

Note that the transfer characteristic is a characteristic obtained by adding a transfer characteristic simulating a route from the location (sound output location) of speaker 53 to the location (sound collection location) of microphone 54, and predetermined parameter F. When the transfer characteristic is expressed by $C\hat{}$, transfer characteristic $C\hat{}$ is expressed by the following (Equation 6).

[Expression 5]

$$C\hat{} = C_m + F \quad \text{(Equation 6)}$$

Specifically, the above transfer characteristic is a gain and phase (phase lag) of each frequency. The transfer characteristic is measured for each frequency in space 56 beforehand, and is stored in storage unit 16. That is, storage unit 16 stores a frequency, and a gain and phase for correcting a signal of the frequency.

First controller 14a acquires the frequency output by frequency detector 12a, reads out (selects) a gain and phase corresponding to the acquired frequency from storage unit 16, and outputs the gain and phase to first correction signal generator 14b and second correction signal generator 14c.

First correction signal generator 14b generates a first corrected standard signal by correcting the first standard signal based on the gain and phase output by first controller 14a. The first corrected standard signal is an example of a corrected standard signal. When the gain output by first controller 14a is denoted by $\alpha$ and the phase is denoted by $\phi_1$, the first corrected standard signal is expressed by $\alpha \cdot \sin(\omega t - \phi_1)$. The generated first corrected standard signal is output to first update unit 15a included in filter coefficient update unit 15.

Second correction signal generator 14c generates a second corrected standard signal by correcting the second standard signal based on the gain and phase output by first controller 14a. The second corrected standard signal is an example of a corrected standard signal. When the gain output by first controller 14a is denoted by $\beta$ and the phase is denoted by $\phi_2$, the second corrected standard signal is expressed by $\beta \cdot \cos(\omega t - \phi_2)$. The generated second corrected standard signal is output to second update unit 15b included in filter coefficient update unit 15.

Storage unit 16 is a storage device in which the transfer characteristics are stored. As has been described, storage unit 16 stores a frequency, and a gain and phase for correcting a signal of the frequency. Note that the transfer characteristic may be stored in storage unit 16 in the form of a transfer function or a filter coefficient.

Storage unit 16 also stores predetermined parameter F, and later-mentioned first filter coefficient A and second filter coefficient B, for example. Specifically, storage unit 16 is implemented by a semiconductor memory or the like. Note that when noise reduction device 10 is implemented by a processor such as a DSP, storage unit 16 also stores a control program executed by the processor. Storage unit 16 may also store other parameters used for signal processing by noise reduction device 10.

[Correction of Error Signal]

Second corrector 17 generates a correction signal by correcting the output signal by predetermined parameter F and adds the generated correction signal to the error signal, to generate a corrected error signal (S14 of FIG. 8) approximating the error signal to an error signal indicating a residual sound occurring in sound reception location 30. Second corrector 17 includes correction signal generator 17a and adder 17b. The error signal is input from second input terminal 11b.

Second input terminal 11b is a terminal formed of metal or the like. An error signal based on a residual sound occurring in the location (sound collection location) of microphone 54 due to interference between a cancellation sound and noise is input into second input terminal 11b. The error signal is output by microphone 54. The location of microphone 54 is a location different from sound reception location 30.

Correction signal generator 17a corrects the output signal by predetermined parameter F expressed by the aforementioned (Equation 5), and outputs the correction signal which is the output signal corrected by predetermined parameter F to adder 17b. Specifically, correction signal generator 17a multiplies the output signal by predetermined parameter F, for example. Such a correction signal is used for correction (addition) to approximate the error signal output from microphone 54 to an error signal indicating a residual sound occurring in sound reception location 30. In other words, the correction signal is used for correction (addition) of an error signal to correct the phase difference between cancellation sound $C_e^*\text{Out}$ and noise $N_e$ in sound reception location 30 to 180 degrees approximately.

Predetermined parameter F is determined experimentally or empirically, based on data actually measured in advance in space 56, or data simulating space 56 and the aforementioned (Equation 5). Predetermined parameter F is stored in storage unit 16. Correction signal generator 17a reads out and uses predetermined parameter F from storage unit 16.

Note that storage unit 16 may store multiple predetermined parameters F, and second corrector 17 (correction signal generator 17a) may switch among and use multiple predetermined parameters F. Second corrector 17 may acquire (detect) a traveling state signal correlated with a traveling state of vehicle 50 in which noise reduction device 10 is used, and switch predetermined parameter F. Specifically, second corrector 17 may select one of multiple predetermined parameters stored in storage unit 16 according to the acquired traveling state signal, and generate a correction signal by correcting the output signal or standard signal by the selected predetermined parameter.

Note that a traveling state refers to information such as an accelerator opening, vehicle speed, engine torque, and gear position. The traveling state signal may be in any form, as long as the traveling state signal is a signal correlated with the traveling state. Vehicle 50 is an example of a mobile body device, the traveling state is an example of a moving state, and the traveling state signal is an example of a moving state signal. The traveling state signal is acquired from vehicle 50 in which noise reduction device 10 is used, for example.

In the aforementioned (Equation 5), $N_e$ and $N_m$ vary according to the traveling state of vehicle 50. Hence, noise reduction device 10 can effectively reduce noise audible in sound reception location 30, by switching predetermined parameter F according to the traveling state.

Adder 17b adds the correction signal to the error signal. Adder 17b outputs the error signal to which the correction signal is added as a corrected error signal, to filter coefficient update unit 15. Note that in practice, correction signal generator 17a described above is configured of multiple taps (multiplication, delay, addition processing) as in the case of a general digital filter, for example. In this case, predetermined parameter F is a coefficient used in multiplication processing of a tap.

By outputting the above-described corrected error signal to filter coefficient update unit 15, the gain and phase of cancellation sound $C_e$*Out are adjusted as shown in aforementioned FIG. 5A.

[Update of Filter Coefficient]

Filter coefficient update unit 15 sequentially updates the filter coefficient (S15 of FIG. 8) based on the generated corrected error signal and the generated corrected standard signal. Filter coefficient update unit 15 includes first update unit 15a and second update unit 15b.

First update unit 15a calculates a first filter coefficient, based on the first corrected standard signal acquired from first correction signal generator 14b and the corrected error signal acquired from second corrector 17. Specifically, first update unit 15a calculates the first filter coefficient so as to minimize the corrected error signal by use of the LMS method, and outputs the calculated first filter coefficient to first filter 13a. Additionally, first update unit 15a sequentially updates the first filter coefficient. When the first corrected standard signal is expressed by $r_1$, and the corrected error signal is expressed by e, first filter coefficient A (corresponding to A in aforementioned (Equation 2)) is expressed by the following (Equation 7). Note that n is a natural number, and corresponds to a sampling cycle. Here, μ is a scalar quantity, and is a step-size parameter that determines the update amount of the filter coefficient for each sampling.

[Expression 6]

$$A(n)=A(n-1)-\mu \cdot r_1(n)\cdot e(n) \quad \text{(Equation 7)}$$

Second update unit 15b calculates a second filter coefficient, based on the second corrected standard signal acquired from second correction signal generator 14c and the corrected error signal acquired from second corrector 17. Specifically, second update unit 15b calculates the second filter coefficient so as to minimize the corrected error signal by use of the LMS method, and outputs the calculated second filter coefficient to second filter 13b. Additionally, second update unit 15b sequentially updates the second filter coefficient. When the second corrected standard signal is expressed by $r_2$, and the corrected error signal is expressed by e, second filter coefficient B (corresponding to B in aforementioned (Equation 2)) is expressed by the following (Equation 8).

[Expression 7]

$$B(n)=B(n-1)-\mu \cdot r_2(n)\cdot e(n) \quad \text{(Equation 8)}$$

[Effects of First Exemplary Embodiment]

The gain and phase of cancellation sound $C_e$*Out output by use of the output signal output by noise reduction device 10 is adjusted by predetermined parameter F. Hence, the phase difference between cancellation sound $C_e$*Out and noise $N_e$ comes close to 180 degrees. Accordingly, noise audible in sound reception location 30 converges to 0.

According to noise reduction device 10, since the error signal is corrected, noise audible in sound reception location 30 can be reduced effectively, even when sound reception location 30 and the location of microphone 54 are different.

Second Exemplary Embodiment

[Correction of Error Signal of Second Exemplary Embodiment]

Figure 9:
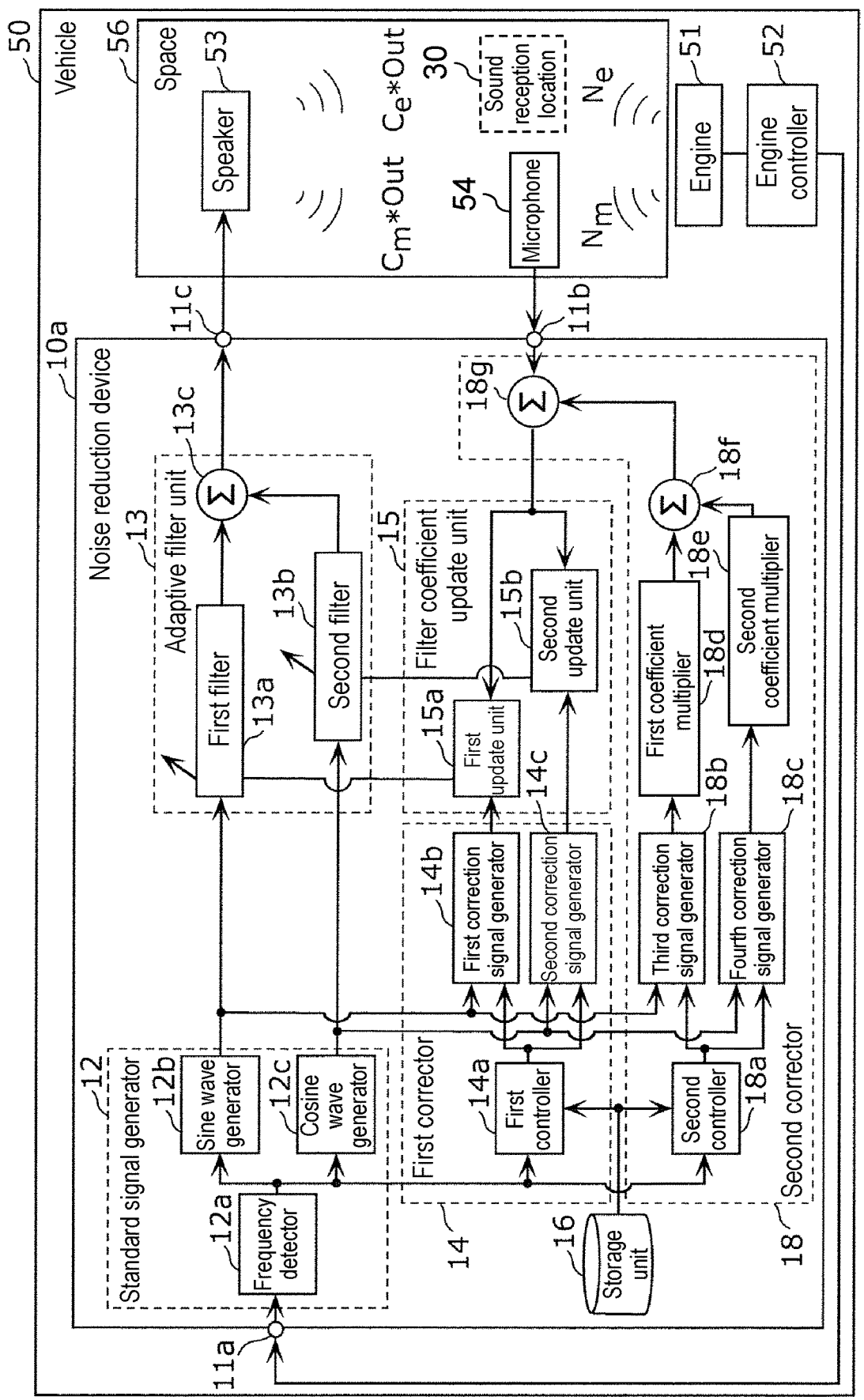
FIG. 9 is a functional block diagram of a noise reduction device of a second exemplary embodiment.

In the first exemplary embodiment, second corrector 17 generates the correction signal by correcting the output signal by predetermined parameter F. However, by correcting the standard signal by predetermined parameter F, the same correction as the correction of the error signal performed by second corrector 17 can be achieved. In a second exemplary embodiment, an example is described in which a standard signal is corrected by predetermined parameter F, so that a signal processing amount (operation amount) for generating a correction signal can be reduced significantly. FIG. 9 is a functional block diagram of a noise reduction device of the second exemplary embodiment. Note that in the second exemplary embodiment below, detailed descriptions of components already described in the first exemplary embodiment are omitted.

As shown in FIG. 9, noise reduction device 10a of the second exemplary embodiment includes second corrector 18 instead of second corrector 17. Second corrector 18 includes second controller 18a, third correction signal generator 18b, fourth correction signal generator 18c, first coefficient multiplier 18d, second coefficient multiplier 18e, first adder 18f, and second adder 18g.

Second controller 18a acquires a frequency output by frequency detector 12a, reads out predetermined parameter F corresponding to the acquired frequency from storage unit 16, and outputs predetermined parameter F to third correction signal generator 18b and fourth correction signal generator 18c. In the second exemplary embodiment, predetermined parameter F is stored as a gain and phase for each frequency in storage unit 16.

Third correction signal generator 18b generates a third corrected standard signal, by correcting a first standard signal output by sine wave generator 12b, based on the gain and phase of predetermined parameter F output by second controller 18a. The generated third corrected standard signal is output to first coefficient multiplier 18d. The third corrected standard signal is the first standard signal whose gain and phase are corrected by parameter F. That is, the signal processing performed by third correction signal generator 18b is the same as the signal processing performed by first correction signal generator 14b, except that the correction amount of the gain and phase is based on parameter F.

Fourth correction signal generator 18c generates a fourth corrected standard signal, by correcting a second standard signal output by cosine wave generator 12c, based on the gain and phase of predetermined parameter F output by second controller 18a. The generated fourth corrected standard signal is output to second coefficient multiplier 18e. The fourth corrected standard signal is the second standard signal whose gain and phase are corrected by parameter F. That is, the signal processing performed by fourth correction signal generator 18c is the same as the signal processing performed by second correction signal generator 14c, except that the correction amount of the gain and phase is based on parameter F.

First coefficient multiplier 18d multiplies the third corrected standard signal output by third correction signal generator 18b by α first filter coefficient. The first filter coefficient used for multiplication is a filter coefficient corresponding to A in the aforementioned (Equation 2), and is sequentially updated by first update unit 15a based on the aforementioned (Equation 7). A third output signal which is the third corrected standard signal multiplied by the first filter coefficient is output to first adder 18f.

Second coefficient multiplier 18e multiplies the fourth corrected standard signal output by fourth correction signal generator 18c by a second filter coefficient. The second filter coefficient used for multiplication is a filter coefficient corresponding to B in the aforementioned (Equation 2), and is sequentially updated by second update unit 15b based on the aforementioned (Equation 8). A fourth output signal which is the fourth corrected standard signal multiplied by the second filter coefficient is output to first adder 18f.

First adder 18f adds the third output signal output from first coefficient multiplier 18d and the fourth output signal output from second coefficient multiplier 18e. First adder 18f outputs the correction signal obtained by adding the third output signal and the fourth output signal to second adder 18g. Such a correction signal is used for correction (addition) to approximate the error signal output from microphone 54 to an error signal indicating a residual sound occurring in sound reception location 30. In other words, the correction signal is used for correction (addition) of an error signal to approximate the phase difference between cancellation sound $C_e$*Out and noise $N_e$ in sound reception location 30 to 180 degrees.

Second adder 18g adds the correction signal to the error signal. Second adder 18g outputs the error signal to which the correction signal is added as a corrected error signal, to filter coefficient update unit 15. By outputting the corrected error signal to filter coefficient update unit 15, the gain and phase of a cancellation sound are adjusted as shown in aforementioned FIG. 5A.

[Effects of Second Exemplary Embodiment]

The gain and phase of cancellation sound $C_e$*Out in sound reception location 30 output by use of the output signal output by noise reduction device 10a of the second exemplary embodiment is adjusted by predetermined parameter F. Hence, the phase difference between cancellation sound $C_e$*Out and noise $N_e$ comes close to 180 degrees. Accordingly, noise audible in sound reception location 30 converges to 0. According to noise reduction device 10a, since the error signal is corrected, noise audible in sound reception location 30 can be reduced effectively, even when sound reception location 30 and the location of microphone 54 are different.

Additionally, the processing performed by second corrector 17 in the first exemplary embodiment is processing using multiple taps, as in the case of a general digital filter. Meanwhile, the second corrector 18 applies predetermined parameter F to a signal of a single frequency, and therefore the processing is performed according to the single frequency. Hence, noise reduction device 10a has an effect of reducing the signal processing amount (operation amount) significantly.

As has been described, the correction signal may be generated by correcting the output signal by predetermined parameter F as in the first exemplary embodiment, or may be generated by correcting the standard signal by predetermined parameter F as in the second exemplary embodiment.

Other Exemplary Embodiments

Although the exemplary embodiments have been described, the present invention is not limited to the above exemplary embodiments.

The noise reduction device of the above exemplary embodiments may be mounted on a mobile body device other than a vehicle. The mobile body device may be an aircraft or a ship, for example. The present invention may also be implemented as such a mobile body device other than a vehicle.

Additionally, although an engine is exemplified as the source of noise in the above exemplary embodiments, the source of noise is not particularly limited, either. The source of noise may be a motor, for example.

Additionally, the configuration of the noise reduction device of the above exemplary embodiments is an example. For example, the noise reduction device may include components such as a digital-to-analogue (DIA) converter, a low-pass filter (LPF), a high-pass filter (HPF), a power amplifier, or an analogue-to-digital (A/D) converter.

Additionally, the processing performed by the noise reduction device of the above exemplary embodiments is an example. For example, part of the processing described in the above exemplary embodiments may be implemented not by digital signal processing, but by analogue signal processing.

Additionally, for example, in the above exemplary embodiments, processing performed by a specific processor may be performed by another processor. Moreover, the order of multiple processes may be changed, or multiple processes may be performed simultaneously.

In the above exemplary embodiments, the constituents may be implemented by dedicated hardware or by execution of software programs individually suitable for the constituents. The constituent elements may be implemented in such a manner that a program execution section such as a central processing unit (CPU) and a processor reads and executes software programs recorded in a recording medium such as a hard disk and a semiconductor memory.

Additionally, each constituent element may be a circuit (or an integrated circuit). The circuits may form one circuit as a whole, or may be individual circuits. The circuits may be a general purpose circuit or a dedicated circuit.

These general or specific aspects of the present invention may be implemented by a system, a device, a method, an integrated circuit, a computer program, or a nontemporary recording medium such as a computer-readable CD-ROM. Moreover, these general or specific aspects may be implemented by an arbitrary combination of the system, the device, the method, the integrated circuit, the computer program, and the nontemporary computer-readable recording medium.

For example, the present invention may be implemented as a noise reduction method executed by a noise reduction device, or be implemented as a program for causing a computer to execute the noise reduction method. The present invention may also be implemented as a noise reduction system including the noise reduction device of the above exemplary embodiment, a speaker (sound output device), and a microphone (sound collection device).

The order of multiple processes of the operation of the noise reduction device described in the above exemplary embodiments is an example. The order of multiple processes may be changed, or the multiple processes may be performed simultaneously.

Moreover, various modifications to the exemplary embodiments that are conceived by those skilled in the art or other exemplary embodiments obtainable by freely combining the structural elements or functions in the exemplary embodiments without departing from the gist of the present invention may be included in the present invention.

INDUSTRIAL APPLICABILITY

The noise reduction device of the present invention is useful as a device for reducing noise in a vehicle interior, for example.

REFERENCE MARKS IN THE DRAWINGS 10, 10a, 10b: noise reduction device
11a: first input terminal
11b: second input terminal
11c: output terminal
12: standard signal generator
12a: frequency detector
12b: sine wave generator
12c: cosine wave generator
13: adaptive filter unit
13a: first filter
13b: second filter
13c, 17b: adder
14: first corrector
14a: first controller
14b: first correction signal generator
14c: second correction signal generator
15: filter coefficient update unit
15a: first update unit
15b: second update unit
16: storage unit
17, 18: second corrector
17a: correction signal generator
18a: second controller
18b: third correction signal generator
18c: fourth correction signal generator
18d: first coefficient multiplier
18e: second coefficient multiplier
18f: first adder
18g: second adder
30: sound reception location
50: vehicle
51: engine
52: engine controller
53: speaker (sound output device)
54: microphone (sound collection device)
55: vehicle main body
56: space

The invention claimed is:

1. A noise reduction device that reduces noise in a sound reception location, the noise reduction device comprising:
a first input terminal that inputs a noise reference signal correlated with the noise;
a standard signal generator that generates a standard signal having a frequency specified based on the input noise reference signal;
an adaptive filter unit that generates an output signal to be used to output a cancellation sound for reducing the noise, by applying a filter coefficient to the generated standard signal;
an output terminal that outputs the generated output signal;
a first corrector that generates a corrected standard signal by correcting the generated standard signal based on a transfer characteristic of a transmission route of the generated output signal;
a second input terminal that inputs an error signal based on a first residual sound occurring in a sound collection location different from the sound reception location due to interference between the cancellation sound and the noise;
a second corrector that generates a correction signal by correcting the generated output signal or the generated standard signal by a predetermined parameter and adds the generated correction signal to the error signal, to generate a corrected error signal approximating the error signal, which is based on the first residual sound occurring in the sound collection location, to an approximated error signal indicating a second residual sound occurring in the sound reception location; and
a filter coefficient update unit that sequentially updates the filter coefficient based on the generated corrected error signal and the generated corrected standard signal.

2. The noise reduction device according to claim 1, wherein the second corrector generates the correction signal by correcting the generated output signal by the predetermined parameter.

3. The noise reduction device according to claim 1, wherein the second corrector generates the correction signal by correcting the generated standard signal by the predetermined parameter, and applying the filter coefficient to the corrected standard signal.

4. The noise reduction device according to claim 1 further comprising a storage unit that stores a plurality of predetermined parameters, wherein the predetermined parameter is one of the plurality of the predetermined parameters and
the second corrector
further acquires a moving state signal correlated with a moving state of a mobile body device using the noise reduction device,
selects one of the plurality of predetermined parameters stored in the storage unit according to the acquired moving state signal, and
generates the correction signal by correcting the generated output signal or the generated standard signal by the selected one of the plurality of the predetermined parameters.

5. A mobile body device comprising:
the noise reduction device according to claim 1;
a sound output device that outputs the cancellation sound by use of the generated output signal; and
a sound collection device that is arranged in the sound collection location and outputs the error signal to the second input terminal.

6. A noise reduction method of reducing noise in a sound reception location, the noise reduction method comprising:
generating a standard signal having a frequency specified based on a noise reference signal correlated with the noise;
generating an output signal to be used to output a cancellation sound for reducing the noise, by applying a filter coefficient to the generated standard signal;
generating a corrected standard signal by correcting the generated standard signal based on a transfer characteristic of a transmission route of the generated output signal;
generating a correction signal by correcting the generated output signal or the generated standard signal by a predetermined parameter;
adding the generated correction signal to an error signal based on a first residual sound occurring in a sound collection location different from the sound reception location due to interference between the cancellation sound and the noise, to generate a corrected error signal approximating the error signal, which is based on the first residual sound occurring in the sound collection location, to an approximated error signal indicating a second residual sound occurring in the sound reception location; and sequentially updating the filter coefficient based on the generated corrected error signal and the generated corrected standard signal.

* * * * *